United States Patent [19]

Saether et al.

[11] Patent Number: 5,694,736
[45] Date of Patent: Dec. 9, 1997

[54] METHOD FOR SECURING A CLADDING PLATE TO A BUILDING SUBSTRATE

[76] Inventors: Kolbjorn Saether; Justine H. Hedrick, both of 1062 W. Chicago Ave., Chicago, Ill. 60622

[21] Appl. No.: 703,202

[22] Filed: Aug. 26, 1996

[51] Int. Cl.$^6$ .............................. B32B 31/14; B32B 31/06
[52] U.S. Cl. .......................... 52/746.1; 156/71; 156/305
[58] Field of Search .................................. 52/746.1, 597, 52/598, 746.12, 747.11, 747.12; 156/79, 292, 305, 71, 297

[56] References Cited

U.S. PATENT DOCUMENTS

| | | |
|---|---|---|
| 3,878,030 | 4/1975 | Cook . |
| 4,101,356 | 7/1978 | Savelkouls . |
| 4,221,619 | 9/1980 | Lemons . |
| 4,277,141 | 7/1981 | Keibler ................................ 156/305 X |
| 4,355,074 | 10/1982 | Stemmler et al. ................. 52/746.1 X |
| 4,422,893 | 12/1983 | Duchateau et al. . |
| 5,135,594 | 8/1992 | Johnston ............................ 156/305 X |
| 5,362,342 | 11/1994 | Murray et al. ......................... 156/71 |

Primary Examiner—Wynn E. Wood
Assistant Examiner—Yvonne Horton-Richardson
Attorney, Agent, or Firm—Welsh & Katz, Ltd.

[57] ABSTRACT

A method for securing a cladding plate to a building substrate by means of an expandable material, such as a hydrophobic polyurethane foam, which is capable of expanding many times its original volume is disclosed. The hydrophobic polyurethane foam is introduced into a space between the cladding plate and the building substrate so as to create an adhesive bond between adjacent surfaces of the cladding plate and building substrate. The foam is introduced into the space either as a free flowing liquid dispensed into a retention basin created in the space or by means of a balloon from which it will expand freely upon fracturing of the balloon. The balloon is constructed so that it will break shortly after the material has turned into foam but before the material has lost its capability of adhering to the cladding plate and building substrate, and before the balloon pressure can overcome the retaining pressure delivered by the cladding plate and building substrate.

20 Claims, 3 Drawing Sheets

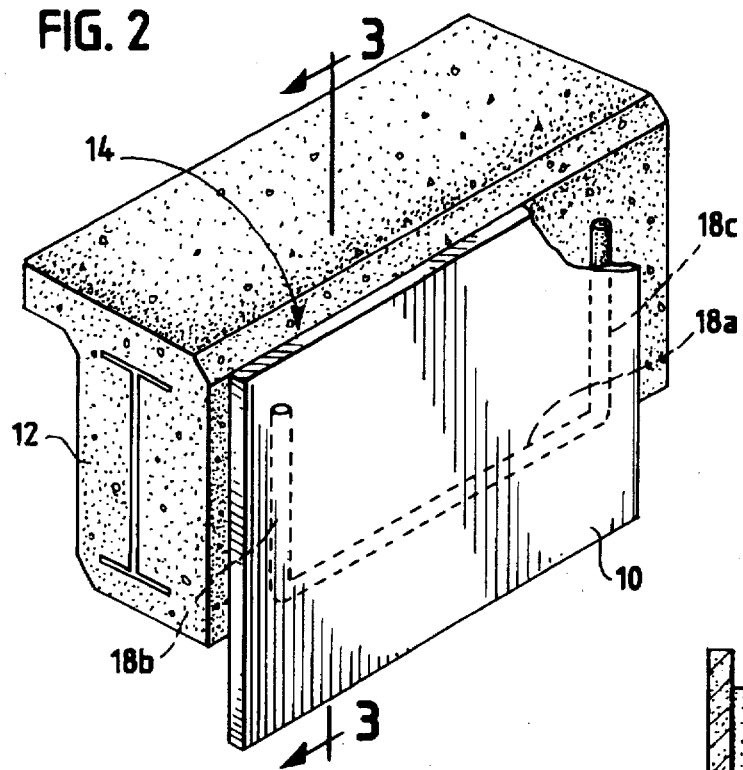
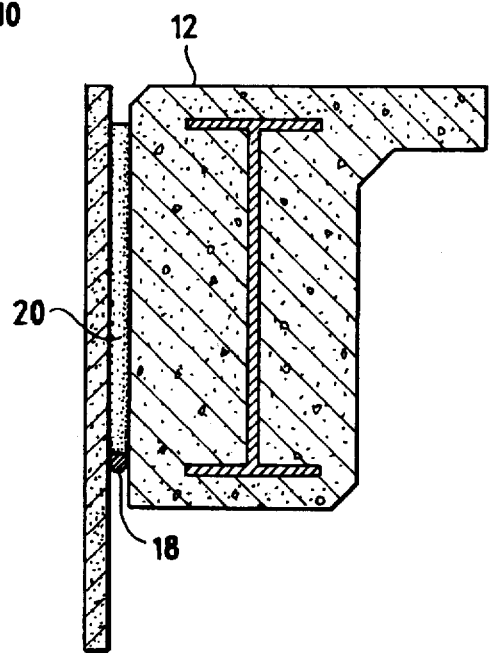
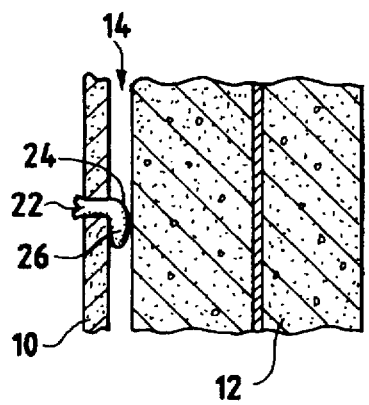

1

METHOD FOR SECURING A CLADDING PLATE TO A BUILDING SUBSTRATE

BACKGROUND OF THE INVENTION

The present invention relates generally to a method for securing a cladding plate to a building substrate and, more particularly, to a novel method of creating an adhesive bond between a cladding plate and a building substrate by introducing an expandable material such as a hydrophobic polyurethane foam into a space defined between the cladding plate and the building substrate.

It is known to secure cladding plates to the outside surface or substrate of a building for decorative purposes. For example, cladding plates such as stone, brick, terracotta, marble and the like frequently are secured to a building substrate such as steel, concrete, masonry and the like, to create a particular facade. Typically, cladding plates are secured to the building substrate by means of support elements such as steel inserts, brackets, clip angles and the like which mount the cladding plates approximately one to two inches away from the building substrate.

Over time, the cladding plates can deteriorate in quality and develop cracks due to exposure to the sun and the adverse effects associated with other environmental conditions. Corrosion of the steel support elements may cause cracks in the cladding plates. If the deterioration and cracking becomes too severe, then portions of the cladding plate may separate and fall onto the area surrounding the building with resultant potential for harm to passersby. To prevent this phenomenon, the cracked cladding plates are usually removed and new cladding plates secured to the building substrate in their place. Recladding a building in this manner is very expensive. Therefore, an inexpensive and highly efficient process for repairing existing cracked cladding plates that fully secures them to a building substrate would provide significant advantages over prior techniques.

It is known in the art to use a foam to secure roof tiles to a roof substrate. See, for example, U.S. Pat. No. 5,362,342 which issued to Murray et al. According to the Murray et al. patent, a stream of a foamable polyurethane having a density in the range of one and one-half to two pounds per cubic foot and a reactivity period between one and one-half to four minutes is sprayed at low pressure onto a roof substrate. The roof tiles are placed into contact with the foamable liquid polyurethane during its reactivity period to secure and adhesively bond the roof tiles to the roof substrate.

SUMMARY OF THE INVENTION

One of the primary objects of the present invention is to provide a novel method for securing a cladding plate to a building substrate by introducing an expandable material, such as a hydrophobic polyurethane foam, that is capable of expanding many times its original volume into a space between the cladding plate and the building substrate so as to adhesively bond the cladding plate to the building substrate.

A more particular object of the present invention is to provide a novel method for securing a cladding plate to a building substrate wherein a predetermined quantity of an expandable material, such as a hydrophobic polyurethane foam, is introduced into a space between the cladding plate and the building substrate. The foam is introduced into the space either as a free flowing liquid dispensed into a confinement trough created in the space between the cladding plate and the building substrate, or by means of an expandable medium, such as a balloon, from which the foam will expand freely upon fracturing of the balloon.

In accordance with one feature of the invention, the balloon is constructed so that it will break shortly after the foamable material has turned into foam but before the foamable material has lost its capability of adhering to adjacent surfaces of the cladding plate and building substrate, and before the balloon pressure can overcome the retaining pressure delivered by the cladding plate and building substrate.

In accordance with the invention, when confined in the space between a cladding plate and a building substrate, the expandable material expands and exerts pressure on adjacent surfaces of the cladding plate and building substrate. The expansion of the foam creates an adhesive bond between the cladding plate and building substrate which significantly extends the useful life of the cladding plates at relatively low cost while substantially improving safety by reducing the likelihood that the cladding plate could separate from the building substrate.

BRIEF DESCRIPTION OF THE DRAWINGS

FIG. 2 is a fragmentary perspective view similar to FIG. 1 but illustrating a confinement trough created in the space between the cladding plate and the building substrate, a portion of the cladding plate being broken away for clarity.

FIG. 3 is a fragmentary sectional view taken substantially taken along line 3—3 of FIG. 2 showing a hydrophobic polyurethane foam adhesively bonding the cladding plate to the building substrate.

FIG. 4 is a fragmentary sectional view similar to FIG. 3 but showing an alternate embodiment of the invention in which a balloon is used to introduce a predetermined quantity of hydrophobic polyurethane foam into a space between the cladding plate and building substrate.

DETAILED DESCRIPTION OF THE PREFERRED EMBODIMENTS

Figure 1:
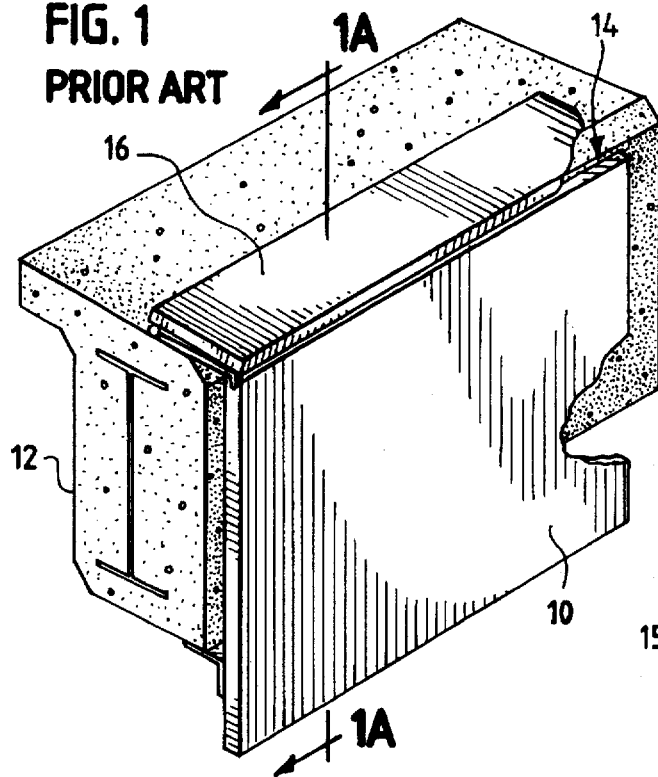
FIG. 1 is a fragmentary perspective view illustrating a cladding plate secured in spaced relation to a building substrate, portions of the cladding plate being broken away for clarity.
Figure 1A:
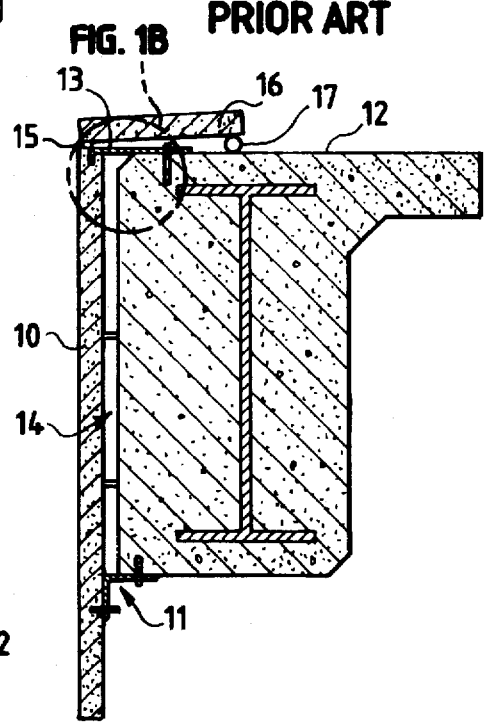
FIG. 1A is a fragmentary sectional view taken substantially along line 1A—1A of FIG. 1 showing a cladding plate secured to a building substrate by means of steel brackets and inserts.
Figure 1B:
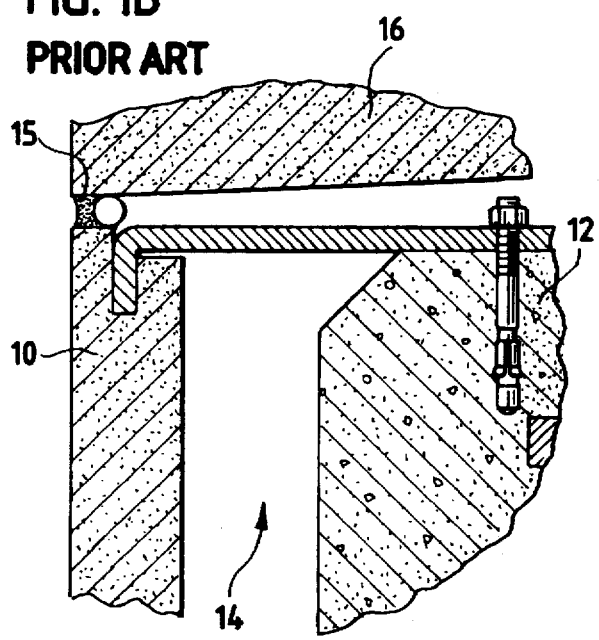
FIG. 1B is a fragmentary sectional view of a portion of FIG. 1A.

Referring now to the drawings, FIG. 1 illustrates a generally rectangular cladding plate 10 which is secured to a building substrate 12 by means of support elements such as bracket assemblies 11 and 13 (FIGS. 1A and 1B). Bracket assemblies 11 and 13 mount cladding plate 10 approximately one to two inches away from and in spaced relation to building substrate 12 so as to define a space 14. The cladding plate 10 may comprise a plate of stone, brick, terracotta, marble or the like, and the building substrate 12 may comprise steel, concrete, masonry, spandrel beams or other conventional building substrates. Typically, cladding plates are secured to the outside surface or substrate of a building and topped off with a capstone, as indicated at 16 in FIGS. 1, 1A and 1B, for decorative purposes and to present an aesthetically pleasing appearance and finish for the building. The capstones also prevent water and other foreign matter from accumulating behind the cladding plates by means of weather seals 15 and 17 as shown in FIGS. 1A and 1B.

In one embodiment, access to space 14 is created by removing the capstone 16 or at least a portion of the capstone 16. A backer rod 18 is inserted into space 14 to form a confinement trough or retention basin as shown in FIG. 2. Preferably, backer rod 18 is made from closed-cell plastic foam and has a diameter larger than the distance that the cladding plate 10 is spaced from building substrate 12. Backer rod 18 is forced down into space 14 so as to form a generally horizontal reach 18a adjacent the bottom edge of building substrate 12 and upwardly directed vertical reaches 18b and 18c adjacent the laterally opposite vertical edges of cladding plate 10. The backer rod 18 thus forms a generally U-shaped retention basin or a cavity having an open upper end.

An expandable material, such as a hydrophobic polyurethane foam, is introduced into the space 14 to create a body of adhesive 20 that bonds to the adjacent surfaces of the cladding plate 10 and building substrate 12, as shown in FIG. 3. To form the adhesive body 20, a predetermined quantity of a polyurethane mix is poured into the retention basin and dispensed along the bottom thereof. Preferably, the polyurethane mix comprises forty parts of hydrophobic polyurethane, one part accelerator and one part water. The components of the polyurethane mix can be varied and other types of expandable materials, such as hydrophilic polyurethane foam, may be used as would be readily apparent to one of ordinary skill in the art. A hydrophobic polyurethane foam and accelerators suitable for use with the present invention are commercially available and are manufactured by Green Mountain International, Inc. (Waynesville, N.C.).

The accelerator causes the polyurethane to expand into a semi-rigid foam which firmly adheres to adjacent surfaces of cladding plate 10 and building substrate 12. The resultant hydrophobic polyurethane foam is capable of expanding up to twenty times its original volume, and, when confined in the retention basin formed by backer rod 18, exerts pressure on adjacent surfaces of cladding plate 10 and building substrate 12. In this way, the foam flows against and adhesively bonds adjacent surfaces of the cladding plate and building substrate together.

For example, assume that cladding plate 10 has dimensions of 3'×7'×1¼", weighs 300 lbs. and is mounted two inches from building substrate 12. Also assume that a backer rod of 2½" diameter is used to form a retention basin. Introducing one gallon of polyurethane mix into the retention basin formed by backer rod 18 ensures that the full depth of the space 14 will be filled with foam and that at least fifty percent of the adjacent surfaces of the cladding plate and building substrate will be covered with foam after it has fully expanded.

Mounting the cladding plate 10 in this manner provides an ultimate tensile strength having a magnitude of about 8 psi or 1152 psf and a shear strength of about 12 psi or 1720 psf. The corresponding design loads are 60 psf in suction during hurricane winds and 16 psf downward load due to the dead load of cladding plate 10. Ensuring that at least fifty percent of the inside surface area of cladding plate 10 is covered with expanded foam and allowing for a certain amount of eccentric loading, the bond between cladding plate 10 and building substrate 12 exceeds safety requirements typical for these types of applications. After the foam has fully expanded, a capstone can be mounted on top of cladding plate 10 to present a smooth edge and provide a more aesthetically pleasing outward appearance.

FIGS. 4–8 illustrate a second embodiment of the invention in which at least one expandable medium, such as a balloon, is used to introduce the predetermined amount of hydrophobic polyurethane foam, as generally discussed above, into space 14 between the cladding plate 10 and the building substrate 12. Referring to FIG. 4, a small aperture 22 is created in cladding plate 10 to allow a balloon 24 containing the predetermined amount of hydrophobic polyurethane foam 26 to be inserted therethrough and into space 14. The balloon 24 is constructed so that it will break shortly after the hydrophobic polyurethane material has turned into foam but before it has lost its capability of adhering to adjacent surfaces of cladding plate 10 and building substrate 12 and before the balloon pressure can overcome the retaining pressure delivered by the cladding plate and building substrate. For example, a balloon of 9" diameter can be used to introduce five ounces of polyurethane mix into space 14. Balloons suitable for use with the present invention are toy balloons which are readily available in any department or drug store.

Figure 5:
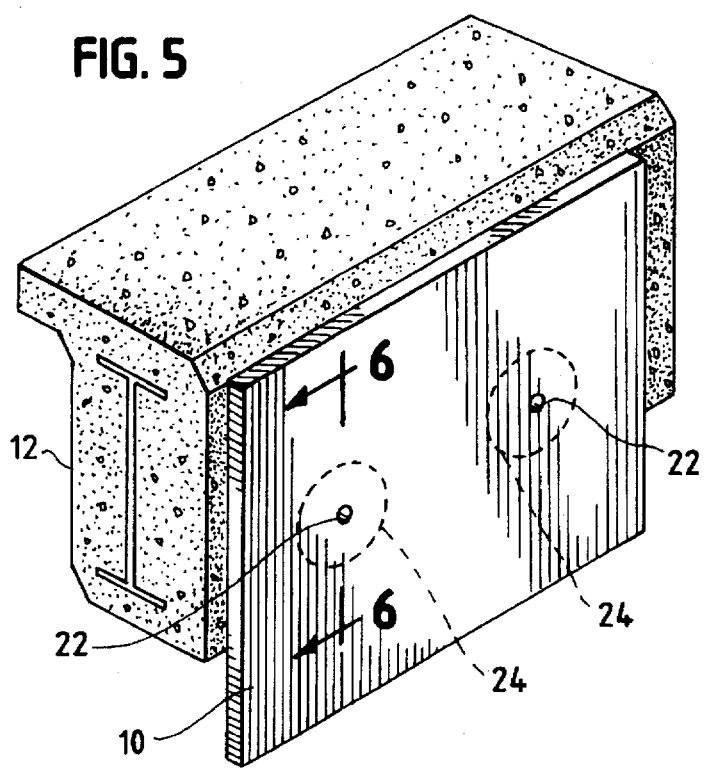
FIG. 5 is a fragmentary perspective view similar to FIG. 1 but illustrating the use of two hydrophobic polyurethane foam filled balloons, each balloon being shown in a partially expanded state.
Figure 6:
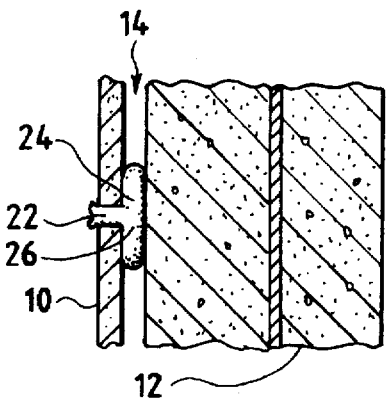
FIG. 6 is a fragmentary sectional view taken substantially along line 6—6 in FIG. 5 and showing one of the balloons illustrated in FIG. 5.
Figure 7:
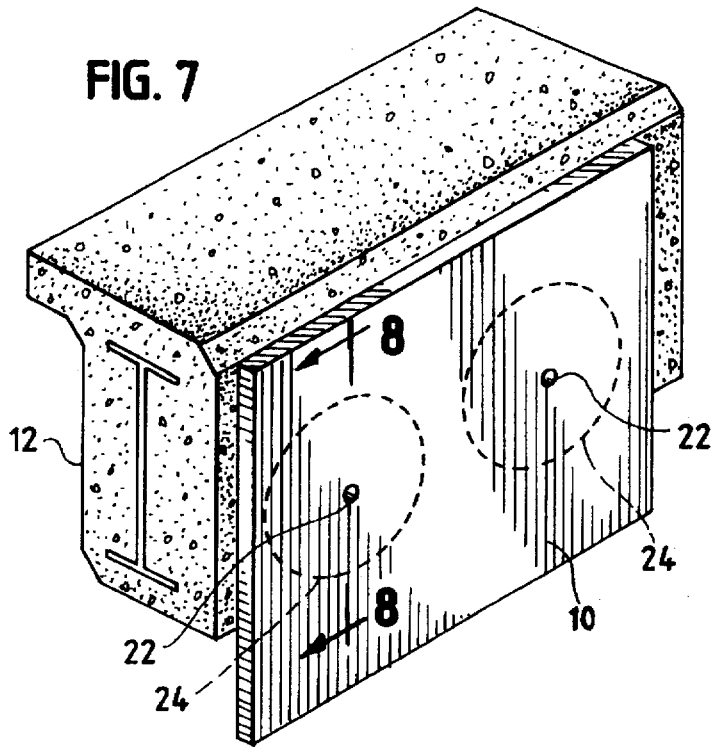
FIG. 7 is a fragmentary perspective view similar to FIG. 5 but showing two areas of hydrophobic polyurethane foam created between the cladding plate and building substrate immediately prior to fracturing of the balloons.
Figure 8:
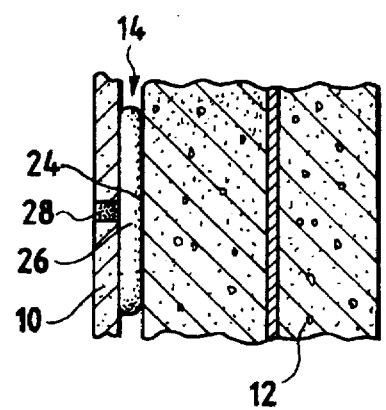
FIG. 8 is a fragmentary sectional view taken substantially along lines 8—8 in FIG. 7 and showing a quantity of hydrophobic polyurethane foam between the cladding plate and building substrate immediately prior to fracturing of the corresponding balloon.

Referring to FIG. 5, two balloons, each shown in a partially expanded state, contain a predetermined amount of hydrophobic polyurethane foam 26 and are used to adhesively bond cladding plate 10 to building substrate 12. When balloons 24 fracture, the hydrophobic polyurethane foam 26 contained therein expands freely. The foam exerts pressure on adjacent surfaces of cladding plate 10 and building substrate 12 and creates an adhesive bond between the two as generally discussed above. Aperture 22 is sealed with a plug 28 shortly after the balloon has been introduced into the space 14 between cladding plate 10 and building substrate 12.

In addition to the foregoing, it should be noted that the present invention can be used to secure cladding plates to a building substrate without the use of steel support brackets and the like. In this case, a brace or the like is used to temporarily hold a cladding plate in a desired position relative to a building substrate to create a space of approximately one to two inches of depth therebetween. Then, a predetermined amount of hydrophobic polyurethane foam material is introduced and allowed to expand in the space thereby adhesively bonding the cladding plate to the building substrate as generally discussed above. After the foam has expanded, the brace can be removed. If desired, c-clamps also can be used to temporarily hold the cladding plate in place during the reactivity period of the foam material.

While the invention has been illustrated and described in detail in the drawings and foregoing description, the same is considered as illustrative and not restrictive in character, it being understood that all changes and modification that come within the spirit of the invention are desired to be protected.

What is claimed is:

1. A method of securing a cladding plate which is mounted on and positioned in spaced relation to a building substrate so as to define a space between the plate and substrate, said method comprising the steps of:

creating access to said space defined between said cladding plate and said building substrate;

placing a predetermined amount of an expandable material into an expandable medium;

introducing said expandable material into said space; and causing said expandable material to expand into said space, burst said expandable medium, and create an adhesive bond between the cladding plate and building substrate.

2. The method of claim 1 wherein said expandable medium comprises a balloon constructed so that it breaks shortly after said material has begun to expand but before said material has lost its capability of adhering to said cladding plate and building substrate and before the balloon creates a pressure sufficient to overcome the retaining pressure delivered by the cladding plate and building substrate.

3. The method of claim 1 said cladding plate is made from a material selected from the group consisting of: stone, brick, terracotta and marble.

4. The method of claim 1 wherein said building substrate is made from a material selected from the group consisting of: steel, concrete, masonry and spandrel beams.

5. The method of claim 1 wherein said predetermined amount of an expandable material is sufficient to allow said foam, after the adhesive bond is created, to cover at least fifty percent of the adjacent surface area or said cladding plate and said building substrate.

6. The method of claim 1 wherein said expandable material comprises polyurethane foam.

7. The method of claim 6 wherein said polyurethane foam comprises hydrophobic polyurethane foam.

8. A method of securing a cladding plate which is mounted on and positioned in spaced relation to a building substrate so as to define a space between the plate and substrate, the cladding plate having a capsone mounted at an edge thereof, said method comprising the steps of:

creating access to said space defined between said cladding plate and said building substrate by removing at least part of said capstone;

introducing a predetermined amount of an expandable material into said space; and causing said expandable material to expand into said space and create an adhesive bond between the cladding plate and building substrate.

9. The method of claim 8 said cladding plate is made from a material selected from the group consisting of: stone, brick, terracotta and marble.

10. The method of claim 8 wherein said building substrate is made from a material selected from the group consisting of: steel, concrete, masonry and spandrel beams.

11. The method of claim 8 wherein said predetermined amount of an expandable material is sufficient to allow said foam, after the adhesive bond is created, to cover at least fifty percent of the adjacent surface area of said cladding plate and said building substrate.

12. The method of claim 8 wherein said expandable material comprises polyurethane foam.

13. The method of claim 12 wherein said polyurethane foam comprises hydrophobic polyurethane foam.

14. A method of securing a cladding plate which is mounted on and positioned in spaced relation to a building substrate so as to define a space between the plate and substrate, said method comprising the steps of:

creating access to said space defined between said cladding plate and said building substrate by creating an aperture in said cladding plate;

introducing a predetermined amount of an expandable material into said space; and causing said expandable material to expand into said space and create an adhesive bond between the cladding plate and building substrate.

15. The method of claim 14 further comprising the step of plugging said aperture after said adhesive bond has been created.

16. The method of claim 14 said cladding plate is made from a material selected from the group consisting of: stone, brick, terracotta and marble.

17. The method of claim 14 wherein said building substrate is made from a material selected from the group consisting of: steel, concrete, masonry and spandrel beams.

18. The method of claim 14 wherein said predetermined amount of an expandable material is sufficient to allow said foam, after the adhesive bond is created, to cover at least fifty percent of the adjacent surface area of said cladding plate and said building substrate.

19. The method of claim 14 wherein said expandable material comprises polyurethane foam.

20. The method of claim 19 wherein said polyurethane foam comprises hydrophobic polyurethane foam.

* * * * *